United States Patent
Nguyen et al.

(10) Patent No.: US 6,240,059 B1
(45) Date of Patent: May 29, 2001

(54) OFF-AXIS OPTICAL PICKUP MECHANISM FOR DUAL-SIDED OPTICAL STORAGE DISCS

(75) Inventors: Michael Anh Nguyen, 47 Lorong Sarhad, Sarhad Ville 119162; Tang Zheng, Singapore, both of (SG)

(73) Assignee: Michael Anh Nguyen (SG)

( * ) Notice: Subject to any disclaimer, the term of this patent is extended or adjusted under 35 U.S.C. 154(b) by 0 days.

(21) Appl. No.: 09/107,250

(22) Filed: Jun. 30, 1998

(30) Foreign Application Priority Data

Jul. 4, 1997 (SG) .................................................. 9702356

(51) Int. Cl.[7] .................................................. G11B 17/08
(52) U.S. Cl. ................... 369/199; 369/44.19; 369/44.17
(58) Field of Search ................... 369/112, 44.37, 369/94.83, 44.12, 44.13, 97, 48, 49, 59, 84, 44.14, 13, 111, 44.17, 44.19, 195, 199

(56) References Cited

U.S. PATENT DOCUMENTS

| | | | |
|---|---|---|---|
| 4,058,834 | * 11/1977 | Miyaoka | 369/112 |
| 4,761,774 | * 8/1988 | Ishibashi et al. | 369/112 |
| 4,972,396 | * 11/1990 | Rafner | 369/44.37 |
| 5,432,763 | * 7/1995 | Campbell et al. | 369/112 |
| 5,493,548 | * 2/1996 | Kamioka | 369/44.37 |
| 5,673,245 | * 9/1997 | Yanagawa et al. | 369/112 |
| 5,768,221 | * 6/1998 | Kasami et al. | 369/94 |
| 5,852,595 | * 12/1998 | Matsui | 369/44.37 |
| 5,896,361 | * 4/1999 | Jung | 369/112 |

* cited by examiner

Primary Examiner—Thang V. Tran
Assistant Examiner—Kim-Kwok Chu
(74) Attorney, Agent, or Firm—Lawrence Y. D. Ho

(57) ABSTRACT

An off-axis optical pickup mechanism for dual-sided optical storage discs comprises an optical pickup unit (OPU) connected to an optical pipe. A baffle is provided which surrounds the OPU and a cover is provided which is placed on top of the baffle. To be able to controllably rotate the optical pipe, a first gear is attached to the pipe. The first gear is meshed with the second gear which is connected to the motor. The optical pipe comprises a top hollow tube having a top channel and a bottom tube having a bottom channel, and a main body having a main channel. Each channel terminates to a lens element. The optical pickup mechanism should be positioned in an optical storage drive such that an optical storage disc can be placed in between the two lens element of the optical pipe.

11 Claims, 3 Drawing Sheets

OFF-AXIS OPTICAL PICKUP MECHANISM FOR DUAL-SIDED OPTICAL STORAGE DISCS

FIELD OF THE INVENTION

The present invention relates generally to the field of optical storage drives, and particularly to an optical pickup mechanism for optical storage drives using dual-sided optical storage discs.

BACKGROUND OF THE INVENTION

Optical storage drives such as CD-ROM and DVD drives are well known in the art. An important element in such drives is the optical pickup unit (OPU). Typically, the OPU comprises laser light emitting diode, light detector, optical lens, and a voice coil. The voice coil is used to position the lens for proper focusing and tracking during a read/write operation. To be able to access different data tracks in an optical storage device, e.g., CD-ROM, the entire OPU has to move radially to the storage device on a linear sliding rail system. The OPU and the mechanism for positioning the OPU shall collectively be referred to as an optical pickup mechanism.

Some optical storage discs, e.g. laser discs and DVDs, have data stored on both sides. Therefore, some optical storage drives are equipped to access data from both sides of the disc. Currently, there are basically three different designs for accessing data from dual-sided discs. One way is to use a U-shape sliding rail system where a single OPU can move to either side of the disc. The second method is to employ two OPUs, one for each side of the disc. The third way is to manually flip the disc so the side to be accessed is facing the OPU.

All of these designs suffer from a number of shortcomings. First and foremost, all of the designs described above use a configuration where the entire OPU moves on a linear sliding rail system. Although this current configuration where the entire OPU moves on a linear sliding rail system has been used successfully for many years, it has its limitations, particularly in light of the current shorter data access time requirement. The OPU is a relatively bulky device which slows down the movement of the entire mechanism, and consequently, the time it takes to move from one track to a different track is increased. Although attempts have been made to increase the mobility of the OPU by applying more powerful motors, this has led to increased vibration, particularly in the voice coil which is most susceptible. Hence, the time saved from increased acceleration is offset by the time it takes to stabilize the unit before the accessed data can be read or written.

In addition, there are problems which are specific to each of the designs mentioned above. For the first design using a U-shaped rail, the system suffers from complexity and bulkiness, and hence takes up excessive amount of space and material. For the second design which uses the two OPUs, the main problem is cost, as OPU is an expensive component in an optical storage drive. For the third design, the main shortcoming is the inconvenience to the user who has to manually flip the disc.

To have a reliable and superior optical pickup mechanism which can read/write both sides of an optical storage disc, it must be capable of high acceleration without incurring vibrational problems. Moreover, it should be simple in design, convenient to the user, and inexpensive to manufacture. Since such a mechanism would greatly shorten the data access time of the current optical storage drives, save time and cost in manufacturing, and be attractive to the end users, it is easy to why such an optical pickup mechanism would be highly desirable and useful.

OBJECTS OF THE INVENTION

It is therefore an object of the present invention to provide optical pickup mechanism which can access data tracks on both sides of a dual-sided optical storage disc.

It is another object of the invention to provide an optical pickup mechanism which would mechanically facilitate a fast data track access in a optical storage drive.

It is another object of the present invention to provide a multi-head optical pickup mechanism which would minimize induced vibration during high acceleration.

It is yet another object of the present invention to provide a multi-head optical pickup mechanism which is simple in design, relatively inexpensive to manufacture, and is convenient.

SUMMARY OF THE INVENTION

The present invention basically comprises an optical pickup unit (OPU) connected to an optical pipe. A baffle is provided which surrounds the OPU and a cover is provided which is placed on top of the baffle. To be able to controllably rotate the optical pipe, a first gear is attached to the pipe. The first gear is meshed with a second gear which is connected to a motor. The pipe should preferably be made of light and durable material to reduce its overall moment of inertia.

The optical pipe comprises a top hollow tube having a top channel and a bottom tube having a bottom channel, and a main body having a main channel. The top and bottom channels terminate to a lens element. The top tube is bent at an angle in two places (here at 90 degrees) though it can be bent at fewer or more places or at a different angle depending on how one wants to direct the light beam. At each of the bent corners, a reflective mirror is placed to direct the light to the respective lens element. For the bottom tube, a reflective mirror is placed at the bend near the lens element, and another mirror is placed at the bottom/main channel junction to direct the light to the lens element.

The mirror at the junction is a special semi-transparent mirror which allows some light to go through while reflecting the rest. Hence, the light which enters the opening of the main channel is both reflected into the top channel and the bottom channel. Similarly, a light beam which is reflected back through the bottom lens element is reflected off the mirrors and is directed towards the opening. A light ray which enters through the top lens element is reflected off the reflective mirrors, but is allowed to go through the semi-transparent mirror at the junction to eventually reach the opening at the main channel.

The OPU is a standard item currently available. The eye of the OPU for emanating and receiving light beams is placed directly under the opening such that any light emanating from the OPU is directed to the lens element, and any light reflected back into the lens element is directed back to the OPU eye.

The optical pipe can rotate freely via the gears and the motor. The present optical pickup mechanism should be positioned in an optical storage drive such that an optical storage disc can be placed in between the two lens elements of the optical pipe. To be able to access all the tracks on an optical storage disc from either side, the pipe should be situated adjacent to the storage device such that the two lens elements of the pipe cut across every track of the optical storage disc when the pipe is rotated. By combining the spinning action of the storage disc and the rotational movement of the optical pipe, any segment of data from the storage device can be uniquely accessed.

DETAILED DESCRIPTION OF THE INVENTION

Figure 1:
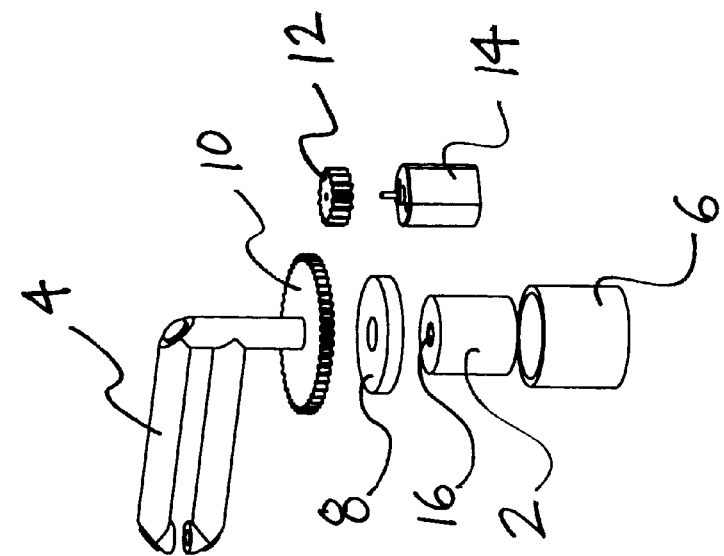
FIG. 1 is a perspective diagram illustrating the present off-axis optical pickup mechanism for dual-sided optical storage discs.
Figure 2:
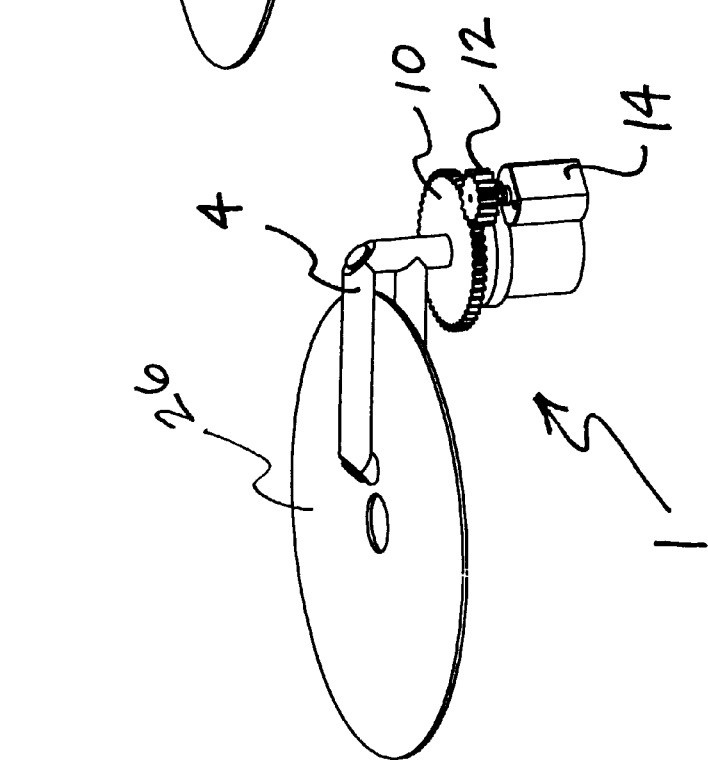
FIG. 2 is a perspective diagram illustrating individual elements comprising the present off-axis optical pickup mechanism.

FIG. 1 illustrates the preferred embodiment of the present optical pickup mechanism 1. As can better seen in FIG. 2, the present invention basically comprises an optical pickup unit (OPU) 2 connected to an optical pipe 4. A baffle 6 is provided which surrounds the OPU and a cover 8 is provided which is placed on top of the baffle 6. The baffle 6 and the cover 8 merely provides some structural support and protects the OPU from dust and damage, and thus are not necessarily integral to the function of the mechanism 1. To be able to controllably rotate the optical pipe 4, a first gear 10 is attached to the pipe 4. The first gear 10 is meshed with the second gear 12 which is connected to the motor 14. The pipe 4 should preferably be made of light and durable material to reduce its overall moment of inertia.

Figure 3:
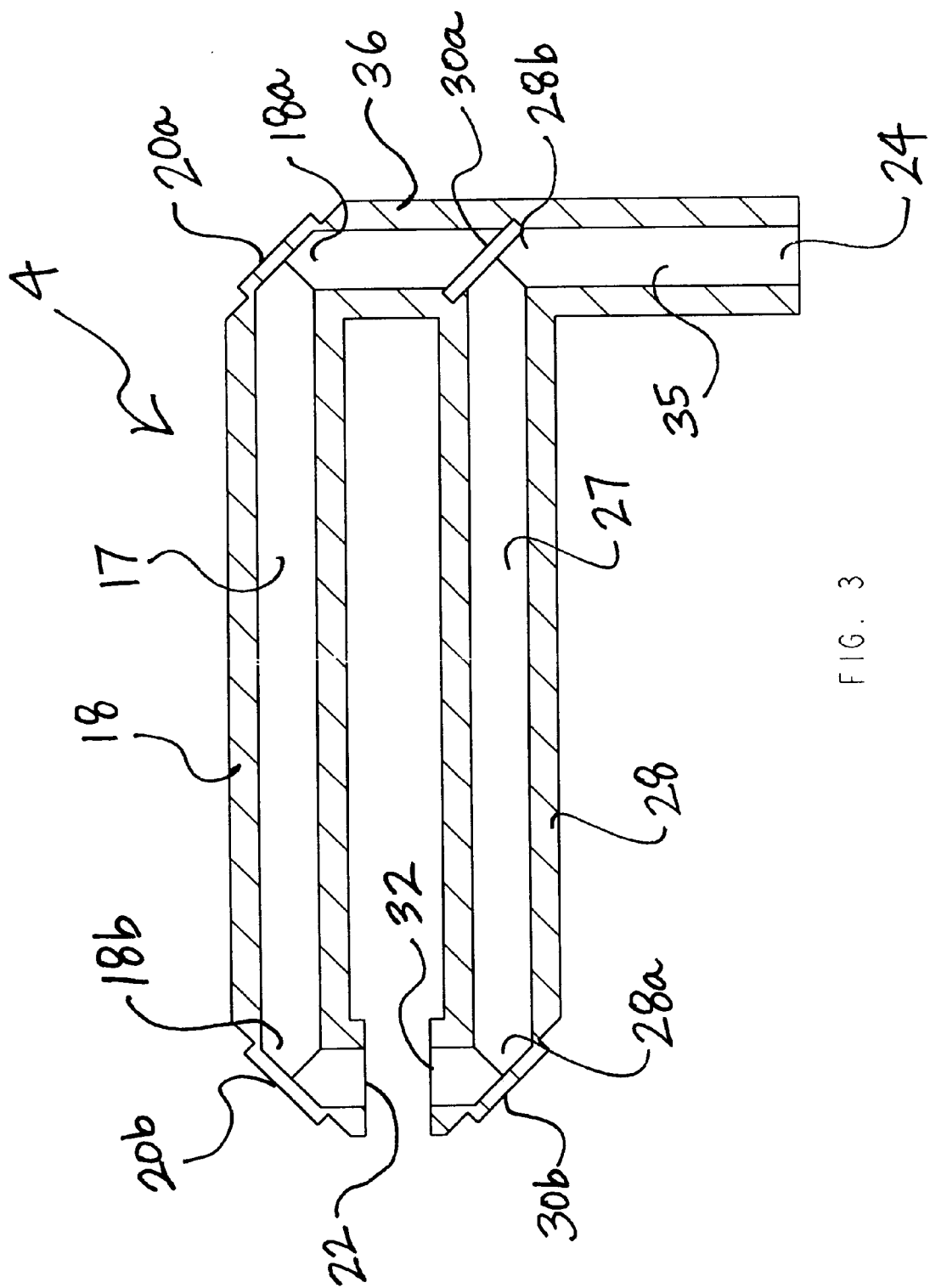
FIG. 3 is a cross-sectional view of the optical pipe of the present off-axis optical pickup mechanism.

In referring to FIG. 3, the optical pipe 4 comprises a top hollow tube 18 having a top channel 17 and a bottom tube 28 having a bottom channel 27, and a main body 36 having a main channel 35. The top tube 18 is bent at an angle in two places (here at 90 degrees), 18a and 18b, though it can be bent at fewer or more places or at a different angle depending on how one wants to direct the light beam. The bottom tube 28 is bent at 28a. At each of the bent corners 18a and 18b of the top tube 18, a reflective mirror, 20a and 20b, is placed to direct the light to the lens element 22. For the bottom tube 28, a reflective mirror 30b is placed at the bend 28a, and another mirror 30a is placed at the bottom/main channel junction 28b to direct the light to the lens element 32.

The mirror 30a is a special semi-transparent mirror which allows some light to go through while reflecting the rest. Hence, the light which enters the opening 24 is both reflected into the top channel 27 and the bottom channel 17. Similarly, a light beam which is reflected back through the lens 32 is reflected off the mirrors 30b and 30a and is directed towards the opening 24; a light ray which enters through the lens 22 is reflected off the mirrors 20b and 20a, but is allowed to go through the mirror 30a to eventually reach the opening 24.

The OPU 2 is a standard item currently available. The eye 16 of the OPU 2 for emanating and receiving light beams is placed directly under the opening 24 such that any light emanating from the OPU 2 is directed to the lens element 22 and 32, and any light reflected back into the lens element 22 and 32 is directed back to the OPU eye 16.

The optical pipe 4 can rotate freely via the gears 10 and 12 and the motor 14. Other means for controllably rotating the optical pipe 4 are clearly available. The present optical pickup mechanism should be positioned in an optical storage drive such that an optical storage disc can be placed in between the lens element 22 and 32 of the optical pipe 4. To be able to access all the tracks on an optical storage disc from either side, the pipe 4 should be situated adjacent to the storage disc 26, as shown in FIG. 1, such that the lens elements 22 and 32 of the pipe 4 cut across every track of the optical storage disc 26 when the pipe 4 is rotated. By combining the spinning action of the storage disc 26 and the rotational movement of the optical pipe 4, any segment of data from the storage device can be uniquely accessed.

The advantages of the present mechanism over the previous designs are many. Particularly, the present mechanism is able to reduce the time to access a new data track because the optical pipe 4 can be accelerated at a high rate due to its low moment of inertia. Unlike the previous design where the entire optical pickup unit had to move, here, only the pipe 4, and not the optical pickup unit, moves. This configuration, moreover, eliminates the vibrational problem associated with the previous design because the element which is most susceptible to induced vibration, the OPU, remains stationary. Finally, the present design is much simpler and relatively inexpensive to manufacture because it does not require a complex rail system, but it simply rotates on a single axis.

Figure 4:
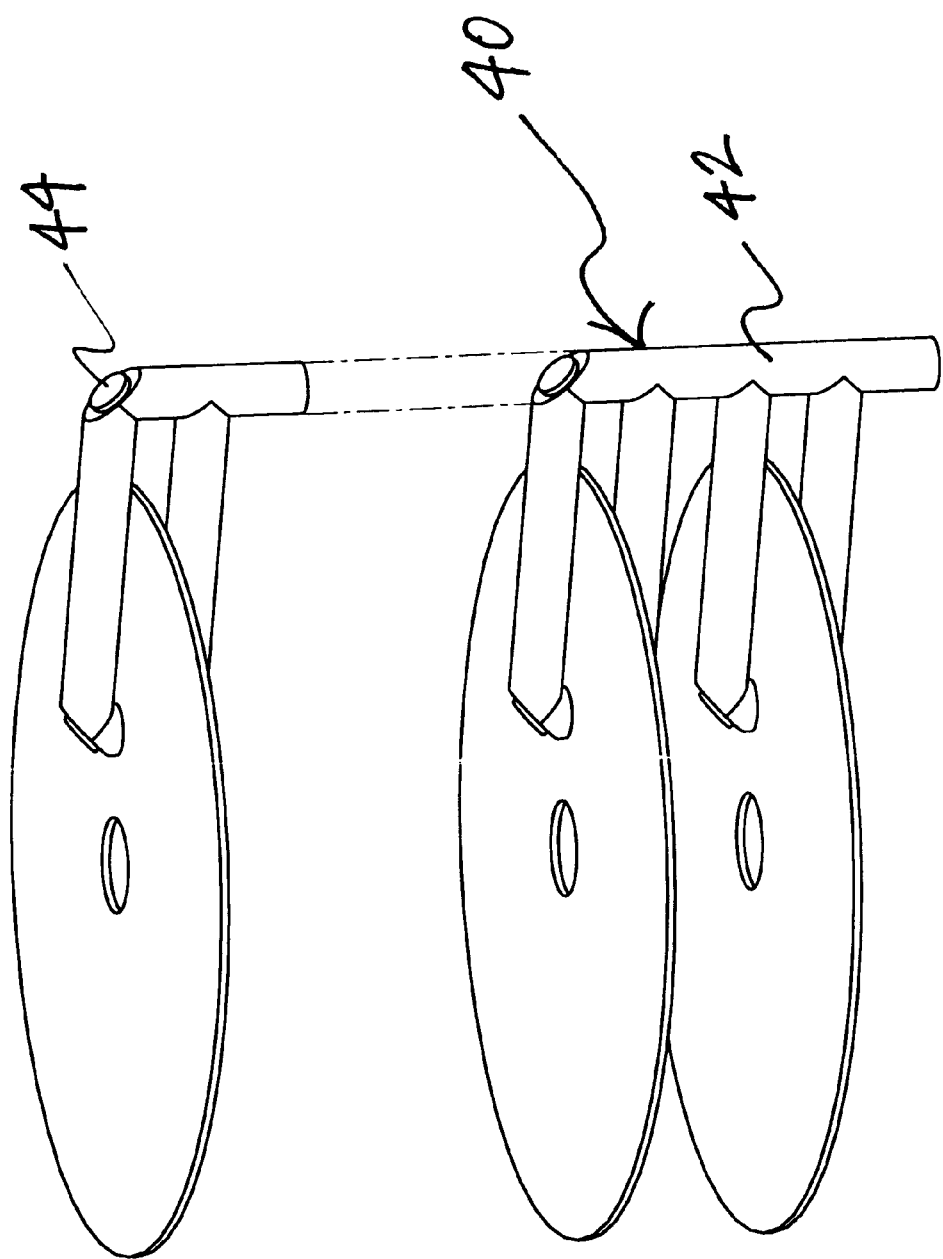
FIG. 4 is a perspective diagram of a multi-head optical pipe adapted for optical storage drives that can accommodate multiple optical storage discs at once.

Although here the preferred embodiment showed the optical pipe 4 with a single head comprising the top 18 and bottom tube 28, it is possible and sometimes desirable to have a multi-head optical pipe 40 as shown in FIG. 4. Here, the optical pipe 40 has three head units, though more or less are clearly possible. The physical and functional structure of each of the head units would be identical to that described for the single-head optical pipe described above except that all of the mirrors placed in the main body 42 would be semi-transparent except the one placed at the top end 44. The optical pickup mechanism having a multi-head optical pipe as shown in FIG. 4 is useful for optical storage drives which can accommodate multiple storage discs at once.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. An off-axis optical pickup mechanism for an optical storage drive, said mechanism particularly adapted for accessing data tracks of a dual-sided optical storage disc, said dual-sided disc having a first side and second side, both said first side and second side having readable data tracks, said mechanism comprising:

an optical pickup unit, said optical pickup unit emanating a light beam through an eye, said eye also receiving a reflected light beam which is reflected back from said optical storage disc;

an optical pipe having a top, bottom, and a main channel for directing the light beam emanating from said optical pickup unit and the reflected light beam, said top and bottom channels having a lens element at one end, said top and bottom channels connected to said main channel at another end, said lens element of said top channel positioned over said first side of the disc, and said lens element of said bottom channel positioned over said second side of the disc, said main channel having an opening at an end, and a semi-transparent reflecting means for directing a part of the light beam emanating from said optical pickup unit to said bottom channel and allowing a part to pass through to said top channel, said semi-transparent reflecting means also directing the reflected light beam in the bottom channel to said opening of said main channel and allowing the reflected light beam in the top channel to pass through to said opening of said main channel, reflecting means in the top channel for directing the light beam emanating from said optical pickup unit towards said lens element of said top channel and for directing said reflected light beam to said opening of said main channel, reflecting means in the bottom channel for directing the light beam emanating from said optical pickup unit towards said lens element of said bottom channel and for directing said reflected light beam to said opening of said main channel, said optical pipe rotatably positioned over said optical pickup unit with said opening in the main channel positioned directly over said eye such that said opening can receive the light beam emanating from said optical pickup unit and direct the reflected light beam back into said eye of the optical pickup unit; and a mechanism for controllably rotating and positioning said optical pipe such that said lens elements can be placed in position to access said data tracks of said first and second side of the optical storage disc without having to move said optical pickup unit.

2. The off-axis optical pickup mechanism as recited in claim 1 further comprising a baffle and cover for said optical pickup unit.

3. The off-axis optical pickup mechanism as recited in claim 1 wherein said mechanism for controllably rotating and positioning said optical pipe comprises a first gear attached to said optical pipe, a second gear meshed with said first gear, and a motor attached to said second gear.

4. The off-axis optical pickup mechanism as recited in claim 1 wherein said reflecting means is a mirror.

5. The off-axis optical pickup mechanism as recited in claim 1 wherein said semi-transparent reflecting means is a semi-transparent mirror.

6. A multi-headed off-axis optical pickup mechanism for a multi-disc optical storage drive, said mechanism particularly adapted for accessing data tracks of a dual-sided optical storage disc, said dual-sided disc having a first side and second side, both said first side and second side having readable data tracks, said mechanism comprising:

an optical pickup unit, said optical pickup unit emanating a light beam through an eye, said eye also receiving a reflected light beam which is reflected back from said optical storage disc;

an optical pipe having plurality of head units, each head unit comprising a top, bottom, and a main channel for directing the light beam emanating from said optical pickup unit and the reflected light beam, said top and bottom channels having a lens element at one end, said top and bottom channels connected to said main channel at another end, said lens element of said top channel positioned over said first side of the disc, and said lens element of said bottom channel positioned over said second side of the disc, said main channel having an opening at an end, and a first semi-transparent reflecting means located at a junction between said main channel and said top channel, and a second semi-transparent reflecting means located at a junction between said main channel and said bottom channel, said first semi-transparent reflecting means directing a part of the light beam emanating from said optical pickup unit to said top channel and allowing a part to pass through, said first semi-transparent reflecting means also directing the reflected light beam in the top channel to said opening of said main channel and allowing the reflected light beam in the main channel to pass through to said opening of said main channel, said second semi-transparent reflecting means directing a part of the light beam emanating from said optical pickup unit to said bottom channel and allowing a part to pass through, said second semi-transparent reflecting means also directing the reflected light beam in the bottom channel to said opening of said main channel and allowing the reflected light beam in the main channel to pass through to said opening of said main channel, reflecting means in the top channel for directing the light beam emanating from said optical pickup unit towards said lens element of said top channel and for directing said reflected light beam to said opening of said main channel, reflecting means in the bottom channel for directing the light beam emanating from said optical pickup unit towards said lens element of said bottom channel and for directing said reflected light beam to said opening of said main channel, said optical pipe rotatably positioned over said optical pickup unit with said opening in the main channel positioned directly over said eye such that said opening can receive the light beam emanating from said optical pickup unit and direct the reflected light beam back into said eye of the optical pickup unit; and a mechanism for controllably rotating and positioning said optical pipe such that said lens elements can be placed in position to access said data tracks of said first and second side of the optical storage disc without having to move said optical pickup unit.

7. The off-axis optical pickup mechanism as recited in claim 6 further comprising a baffle and cover for said optical pickup unit.

8. The off-axis optical pickup mechanism as recited in claim 6 wherein said mechanism for controllably rotating and positioning said optical pipe comprises a first gear attached to said optical pipe, a second gear meshed with said first gear, and a motor attached to said second gear.

9. The off-axis optical pickup mechanism as recited in claim 6 wherein said reflecting means is a mirror.

10. The off-axis optical pickup mechanism as recited in claim 6 wherein said semi-transparent reflecting means is a semi-transparent mirror.

11. The off-axis optical pickup mechanism as recited in claim 6 wherein said semi-transparent means at an upper end of said main channel is replaced with a completely reflective mirror.

* * * * *